US008055432B2

(12) United States Patent
Sun et al.

(10) Patent No.: US 8,055,432 B2
(45) Date of Patent: Nov. 8, 2011

(54) METHOD AND SYSTEM OF TRANSIENT CONTROL FOR HOMOGENEOUS CHARGE COMPRESSION IGNITION (HCCI) ENGINES

(75) Inventors: Ruonan Sun, Ann Arbor, MI (US); Xiaoguo Tang, Canton, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 312 days.

(21) Appl. No.: 12/221,825

(22) Filed: Aug. 7, 2008

(65) Prior Publication Data

US 2010/0031924 A1 Feb. 11, 2010

(51) Int. Cl.
*B60T 7/12* (2006.01)
*G05D 1/00* (2006.01)
*G06F 7/00* (2006.01)
*G06F 17/00* (2006.01)
*F02M 7/00* (2006.01)

(52) U.S. Cl. ........................ 701/103; 123/435
(58) Field of Classification Search .................. 123/435, 123/436, 494, 295, 305, 430; 701/105, 110, 701/111; 73/114.16, 114.17, 114.38
See application file for complete search history.

(56) References Cited

U.S. PATENT DOCUMENTS

| 6,508,229 | B2* | 1/2003 | Miyakubo et al. | 123/305 |
| 7,237,532 | B2* | 7/2007 | Gray, Jr. | 123/435 |
| 2002/0007670 | A1* | 1/2002 | Sano | 73/117.3 |
| 2002/0059914 | A1* | 5/2002 | Yamaguchi et al. | 123/299 |
| 2003/0168037 | A1* | 9/2003 | zur Loye et al. | 123/295 |
| 2003/0188714 | A1* | 10/2003 | Yamamoto et al. | 123/435 |
| 2005/0229903 | A1* | 10/2005 | Kobayashi et al. | 123/435 |
| 2005/0251322 | A1* | 11/2005 | Wang et al. | 701/114 |
| 2006/0086176 | A1* | 4/2006 | Piewek et al. | 73/35.12 |

* cited by examiner

*Primary Examiner* — Stephen K Cronin
*Assistant Examiner* — Sizo Vilakazi
(74) *Attorney, Agent, or Firm* — David H. Read (57) ABSTRACT

A HCCI engine with a model reference adaptive feedback control system maintains stable HCCI combustion during speed/load transitions by: (1) estimating the maximum rate of pressure rise (MRPR), for each cycle, from an extra-cylinder sensor metric, such as a crankshaft dynamics or knock sensor metric, via statistical vector-to-vector correlation; (2) periodically self-tuning the vector-to-vector correlation; (3) applying knowledge base models to guide cycle-to-cycle adjustments of fuel quantity and other engine parameters, to maintain a target MRPR value.

18 Claims, 7 Drawing Sheets

METHOD AND SYSTEM OF TRANSIENT CONTROL FOR HOMOGENEOUS CHARGE COMPRESSION IGNITION (HCCI) ENGINES

FIELD OF THE INVENTION

The present invention relates to methods for controlling combustion in a homogeneous charge compression ignition (HCCI) engine, also known as a premixed charge compression ignition (PCCI) engine.

BACKGROUND OF THE INVENTION AND DESCRIPTION OF RELATED ART

The prior art has long recognized that several parameters of engine operation influence the initiation of combustion in an HCCI engine. See, for example, U.S. Pat. No. 6,286,482 to Flynn et al., and Aceves, HCCI Combustion: Analysis and Experiments, SAE 2001-01-2077. Such recognized parameters, collectively designated herein as "engine state parameters," include: compression ratio, intake charge temperature, oxygen concentration in the charge air, equivalence ratio, charge air density, and boost pressure. Long lacking, however, was a practical method for adjustment of these and other parameters in a way to control the timing or efficiency of HCCI combustion.

Recently, commonly assigned U.S. Pat. No. 7,237,532 to Gray et al. provided a method for maintaining stable, efficient HCCI combustion across the operating range of an engine using gasoline-like fuels, through closed-loop feedback control of a cylinder-specific combustion parameter, preferably, the maximum rate of pressure rise (MRPR) inside the cylinder. Gray et al. were the first to teach the use of MRPR for HCCI control, but their method did not overcome the prior art's dependence on the use of in-cylinder pressure transducers for MRPR measurement. Reliance on in-cylinder transducers is a substantial drawback due to (1) their high cost, poor reliability, and short life span, and (2) the heavy computational load associated with the necessary, near-continuous (high-resolution) sampling. The present invention overcomes this limitation in the prior art by providing a method for MRPR estimation based on signals from existing extra-cylinder sensors—production-engine sensors physically located outside the combustion cylinder—such as a crankshaft position sensor or knock sensor, thereby eliminating the need for in-cylinder pressure transducers, and substantially reducing computational load.

The prior art includes methods for estimating some combustion parameters without in-cylinder pressure measurements. In particular, U.S. Pat. No. 6,866,024 to Rizzoni et al. provides a method for estimating the net output torque of a combustion event, based on crankshaft dynamics and a reconstructed cylinder indicated pressure. Similarly, U.S. Patent Application 2003/0236611 by James et al. describes using measurements of crankshaft acceleration to calculate indicated mean effective pressure (IMEP), output torque, or work per cylinder. These methods, however, are limited to statistical approaches unaided by self-tuning or other intelligent guidance for robustness. Moreover, these methods do not estimate MRPR, nor do they recognize the physical significance of MRPR in characterizing HCCI combustion, thus teaching away from the use of MRPR for HCCI engine control.

Figure 2:
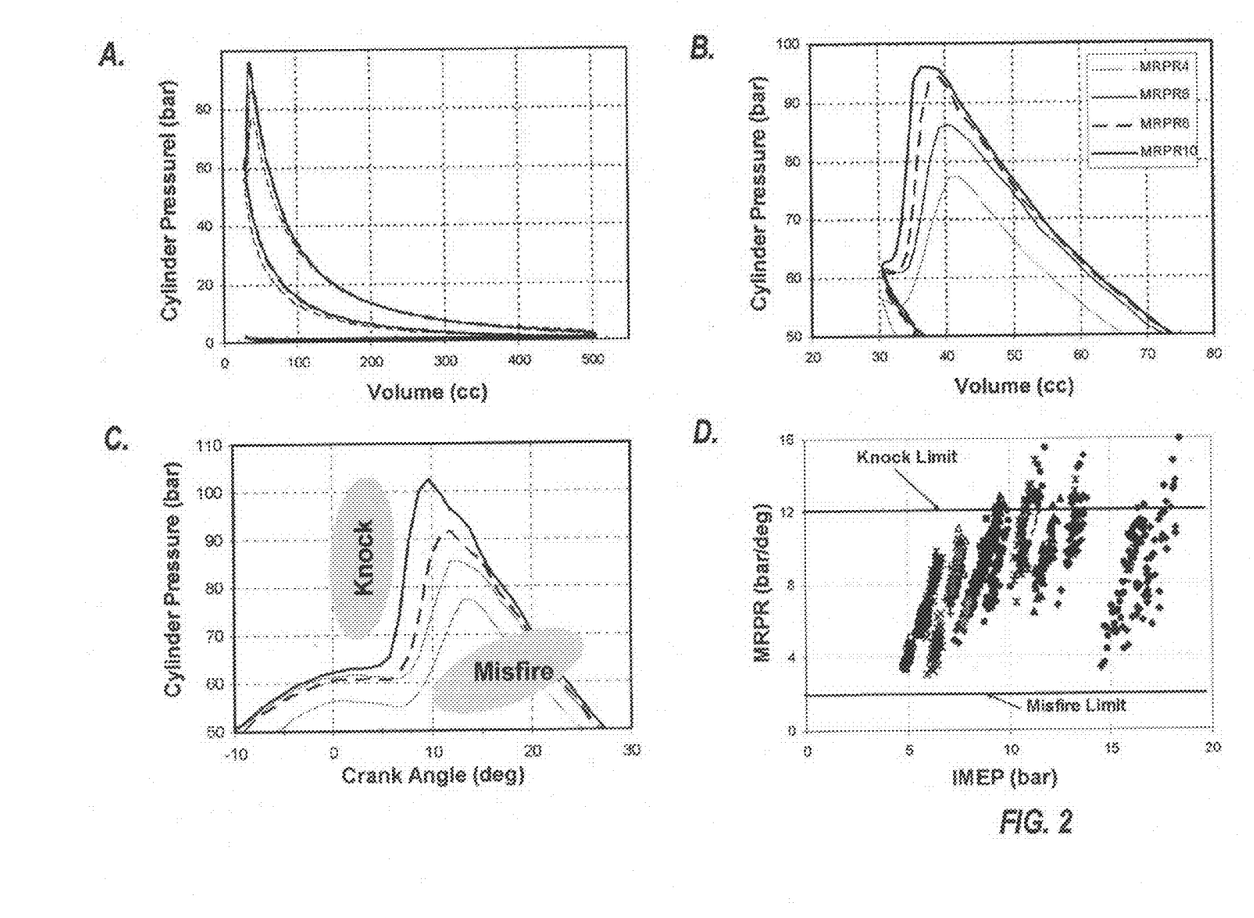
FIGS. 2A and 2B are graphs presenting cylinder pressure as a function of volume (PV diagram) for a HCCI engine cycle.
FIG. 2C is a graph presenting the variation of cylinder pressure as a function of crank angle (PΦ diagram)
FIG. 2D is graph presenting the relationship between the maximum rate of pressure rise (MRPR) and indicated mean effective pressure (IMEP) for different engine states.

The inventors have noted that, once initiated, the HCCI combustion process has a very short duration relative to combustion in a conventional spark-ignition engine; HCCI combustion thus occurs at near-constant cylinder volume. FIG. 2A shows the pressure-volume (PV) diagram for a HCCI engine cycle; the combustion (pressure rise) segment is shown expanded in FIG. 2B. Cylinder pressure rise during HCCI combustion traces approximately a straight line, as a function of cylinder volume, with a sharp, near-vertical slope (FIG. 2B); the same is true when cylinder pressure is plotted as a function of crank angle position (FIG. 2C, PΦ diagram). This feature of the curves in FIG. 2 captures several critical characteristics of HCCI combustion, as noted by the inventors. First, all HCCI events can be described as "quasi-constant volume" combustion. Second, because the maximum rate of pressure rise (MRPR) is a straight-line slope—rather than the point of maximal curvature as is the case for conventional spark-ignition (SI) combustion—it can be used to characterize HCCI burning. Third, the MRPR value is a robust indicator of HCCI combustion status. In particular, MRPR values below a lower limit (around 2 bar/deg) indicate misfire, while values above an upper limit (around 12 bar/deg depending on engine type) indicate knock; between these limits, HCCI combustion is stable, MPRR is proportional to IMEP for any given engine operating range (see FIG. 2D), and MRPR varies in proportion to fuel quantity.

MRPR thus proves to be a uniquely rich source of information about HCCI combustion physics, and is important for HCCI engine transient control: no other single combustion parameter carries the same wealth of information, or captures HCCI combustion status with the same robustness. By way of example, FIG. 2D shows the relationship between MRPR and IMEP (a combustion parameter of considerable focus in the prior art), for different states and speed/load points of a HCCI engine. For a given speed/load point, IMEP and MRPR are highly correlated because of the quasi-constant volume behavior of HCCI combustion. However, while MRPR limits on stable HCCI combustion are fixed across the engine's operating range, the stable-combustion range of IMEP values varies widely depending on engine state. Prior art methods for crankshaft-based estimation of combustion characteristics, however, have focused exclusively on IMEP and similar parameters, and away from MRPR.

OBJECT OF THE INVENTION

An object of the present invention is to provide robust HCCI engine control. A second object of the invention is to provide a method for estimating the value of MRPR from an integrated metric of signals from extra-cylinder sensors, such as a knock sensor or a crankshaft position sensor, thereby eliminating the need for expensive and unreliable in-cylinder pressure transducers, and substantially reducing the computational load of control operation. A third object of the invention is to provide for even more robust, closed-loop control of MRPR, through intelligent guidance, by combining self-tuning, for long-term MRPR estimation accuracy, with a model reference adaptive control scheme, for convergence and error optimization during engine transients.

SUMMARY OF THE INVENTION

Building on applicants' insight into the unique advantages of the maximum rate of pressure rise (MRPR) as a robust indicator of HCCI combustion status, the present invention provides a HCCI engine and MRPR-based control system for maintaining stable, efficient HCCI combustion across the engine's operating range, and across individual cylinders of a multi-cylinder engine. This is accomplished by estimating the maximum rate of pressure rise, MRPR, that is inside each cylinder, and employing model reference adaptive control to maintain MRPR around a target value. In particular, the invention provides a method for estimating the value of MRPR from an integrated metric of the signals received from an existing, extra-cylinder sensor—e.g., in the preferred embodiment, a crankshaft dynamics metric, calculated using signals from a crankshaft position sensor. The present invention further provides for self-tuning, through the use of multiple extra-cylinder sensor metrics, in order to ensure long-term MRPR estimation accuracy. Finally, model reference adaptive control is employed for MRPR convergence and error optimization during both steady state and transient engine operation.

Under the preferred embodiment of the present invention, HCCI control operates by:

(1) calculating an integrated metric of crankshaft dynamics, for each cycle of each cylinder, using signals from a crankshaft position sensor and an engine control module counter, (2) calculating an integrated metric of knock sensor voltage, (3) estimating the maximum rate of pressure rise (MRPR) from either the crankshaft dynamics metric or the knock sensor metric, via knowledge base statistical vector-to-vector correlation functions, (4) periodically calibrating, or "self-tuning", the statistical vector-to-vector correlation functions for MRPR estimation, using the dual inputs of the knock sensor metric and crankshaft dynamics metric, (5) calculating the cycle-to-cycle error, or deviation, between the determined and target values of MRPR or between the corresponding values of either the crankshaft dynamics metric or knock sensor metric, (6) determining fuel quantity for the next combustion cycle of each cylinder, based on the cycle-to-cycle error (the feedback signal), in order to maintain a target MRPR during steady-state operation, (7) achieving commanded changes in speed/load by (a) adjusting a combination of one or more engine state parameters (e.g., intake temperature, intake pressure, intake oxygen concentration, or compression ratio), with selection of the adjusted parameters, along with the magnitude and sequence of adjustment, guided by a knowledge base reference model of the engine's transient operation, and (b) adjusting cycle-to-cycle fuel quantity, based on the feedback error signal as well as guidance from the knowledge base reference model, which guidance is used to correct fuel adjustments based on the current and target engine speed/load points and on the effects of the adjusted engine state parameters, in order to maintain a target MRPR value through the speed/load transition.

In summary, the present invention provides an engine under model reference adaptive feedback control, with self-tuning, to maintain stable HCCI combustion during both steady state and transient operation. The HCCI engine of the present invention controls load (and reacts to speed changes) by adjusting a combination of engine state parameters (e.g., intake temperature, intake and exhaust oxygen concentration, intake boost, engine cooling, etc.). Fuel adjustments follow, on a cycle-by-cycle basis, in order to provide the desired engine load at a given speed, while maintaining a target MRPR value. Importantly, the present invention employs knowledge base models to estimate the value of MRPR from an integrated metric of combustion-correlated extra-cylinder sensor signals, e.g. a crankshaft dynamics or knock sensor metric, via statistical vector-to-vector correlation. Self-tuning of the statistical vector-to-vector correlation ensures long-term control robustness and MRPR estimation accuracy. Finally, knowledge base reference models provide guidance for fuel rate and other adjustments during transient engine operation, where a feedback signal and a steady-state operating map would be inadequate for engine control.

DETAILED DESCRIPTION OF THE INVENTION

Engine Hardware

Figure 1:
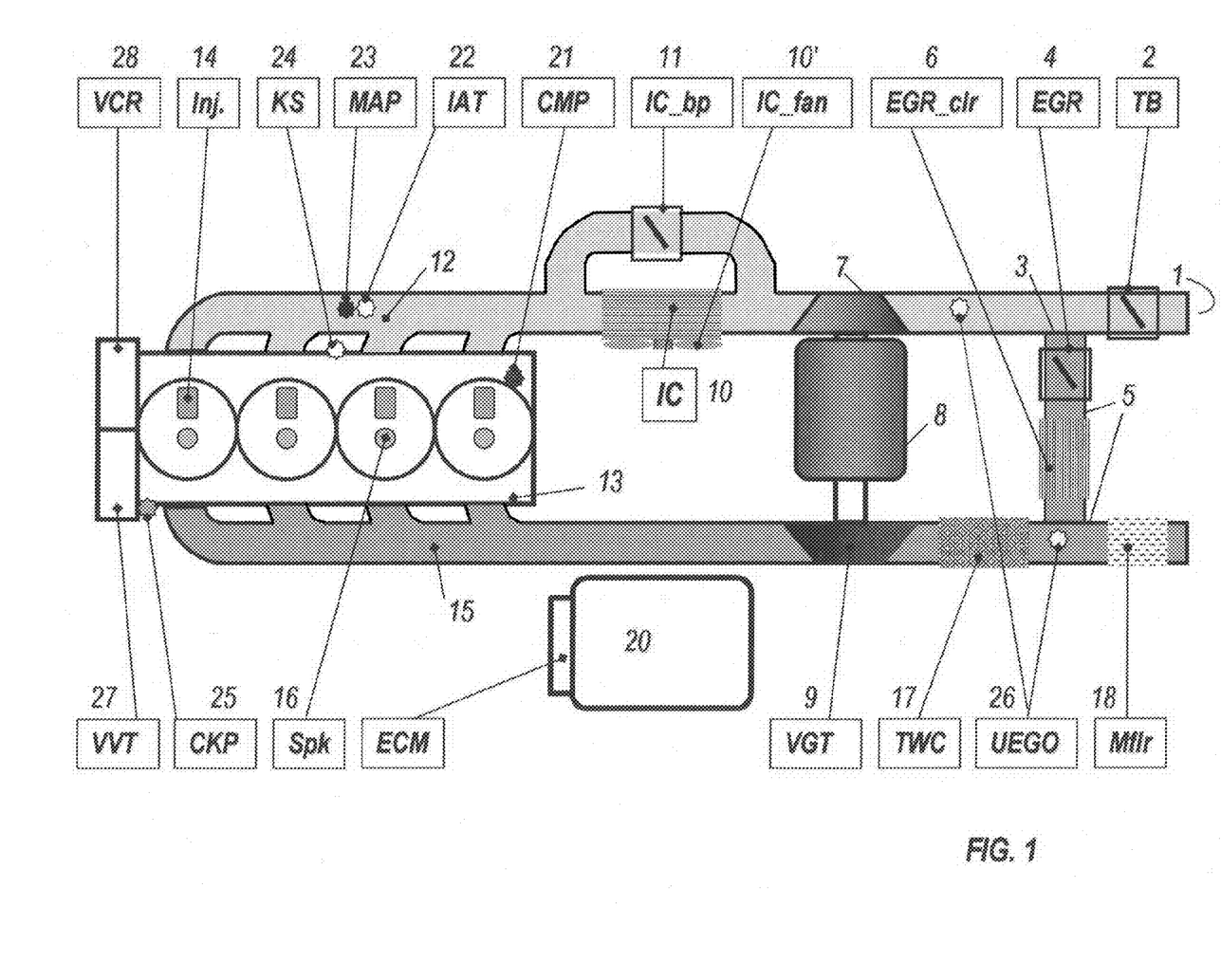
FIG. 1 is a schematic diagram of a preferred embodiment of the HCCI internal combustion engine system of the present invention.

FIG. 1 shows a preferred embodiment of the HCCI combustion system of the present invention for a multicylinder engine. Intake air enters the intake system at port 1 and flows through a throttle valve 2. Exhaust gas may be mixed with the intake air (forming the charge-air mixture) at port 3, with EGR (exhaust gas recirculation) control valve 4 in the exhaust line 5 regulating the amount of exhaust gas flowing to port 3 through cooler 6. Charge-air (referring herein to all air taken into the cylinder for combustion, regardless of whether exhaust gas is recirculated for combustion) then flows through compressor 7, which may be driven by turbine 9 and/or optional electric motor 8. The compressor 7, motor 8 and turbine 9 are collectively called the "boost system"; a preferred boost system is a single variable geometry turbo (VGT).

Continuing with FIG. 1, a portion or all of the charge-air may bypass intercooler 10 along with fan 10', such flow being controlled by bypass valve 11. The charge-air then enters the intake manifold 12 and engine 13. Fuel injectors 14 are used to supply fuel to each cylinder. The preferred embodiment herein uses gasoline as the fuel, but other fuels could also be used, as will be understood in the art. The charge-air and fuel enter the engine combustion chamber (not shown) through conventional intake valves (not shown). Combustion occurs and the exhaust gases exit the combustion chamber through conventional exhaust valves (not shown) into exhaust manifold 15.

In engine 13, each cylinder may contain a spark plug 16 (or other ignition means such as intake air heater, as well known in the art) for use in cold starting the engine, or for operating in spark-ignition mode at high loads. Exhaust gas flows through three-way catalyst 17 for exhaust clean-up; catalyst 17 may be located before or after turbine 9 or both. The exhaust gas then flows through turbine 9, catalyst 17 and muffler 18, then exiting exhaust line 5 to ambient.

Preferred engine hardware includes variable valve timing (VVT) 27 and/or variable compression ratio (VCR) mechanism 28; both mechanisms are mainly used to control the compression ratio, as is well known in the art.

To manage the system for HCCI combustion, ECM 20 receives a variety of inputs from various sensors, which may include cam position sensor 21, charge-air temperature sensor 22, charge-air pressure sensor 23, knock sensor 24, crankshaft position sensor 25, and oxygen sensor 26. ECM then sends a variety of corresponding control commands to various valves, actuators and devices, as known in the art, such commands determined in the present invention from knowledge base models and self-tuning regulators, to control the engine operation as described in more detail hereinafter.

In order to maintain operation of the above engine system in stable HCCI combustion, during both steady state operation and in connection with changes in power level demand, control of the system proceeds first by determining the maximum rate of pressure rise, MRPR (expressed in units of bar per crank angle degree), for each cycle of each cylinder. MRPR may be estimated from an integrated metric of crankshaft dynamics, as follows.

A Crankshaft Dynamics Metric Correlated to MRPR

Figure 3:
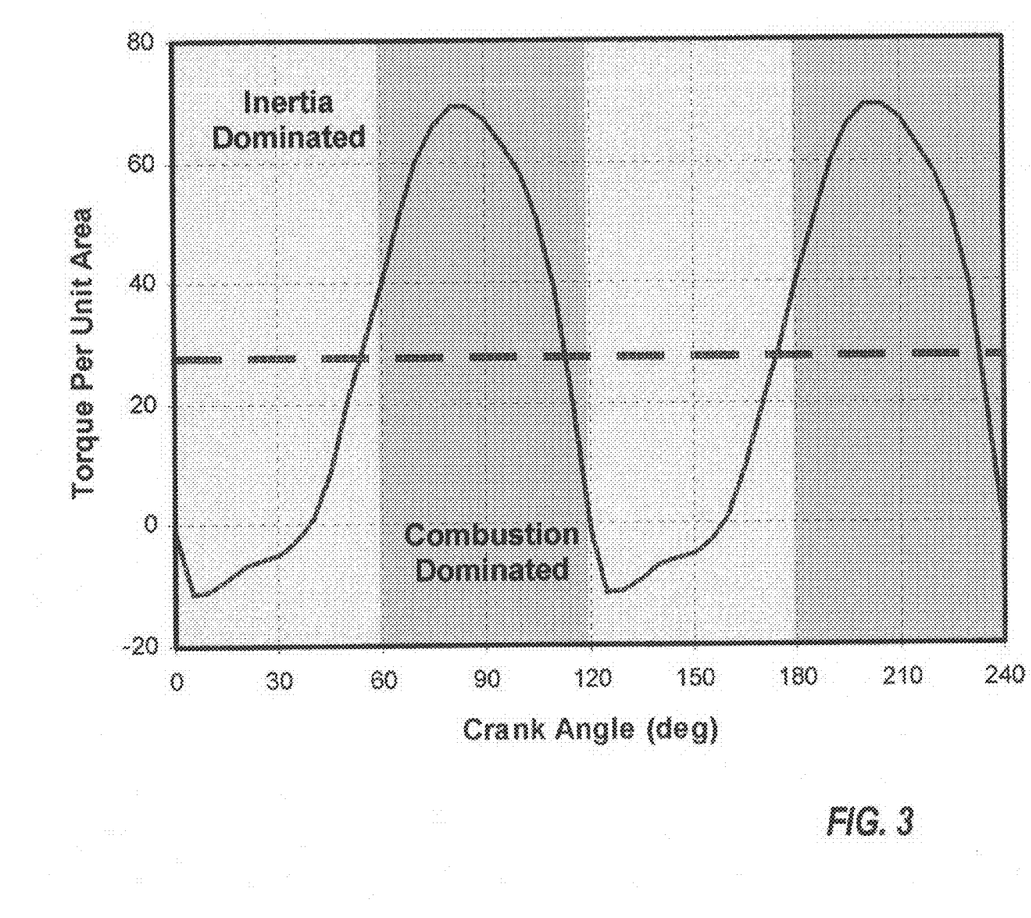
FIG. 3 is a graph presenting the variation of output torque per unit piston surface area as a function of crank angle, for an evenly fired 6-cylinder engine.

In an internal combustion engine, crankshaft torque and rotational velocity fluctuate with successive combustion events. Instantaneous crankshaft torque is the sum of two time-varying components: the inertia torque (created by the piston, rings, pin, connecting rod, etc., in reciprocating motion), which is a function of rotational velocity and crank angle alone; and the combustion torque, created by cylinder gas pressure (top-bottom differential) and determined by the combustion status or heat release rate. FIG. 3 traces instantaneous crankshaft torque (per unit area of piston surface), as a function of crank angle (CA), for an evenly fired 6-cylinder engine. Summation of the inertia and combustion torque components (for all cylinders) produces a biphasic modulation that repeats with sequential cylinder firings: a negative phase, dominated by the inertia torque, is followed (every 120 degrees for the 6-cylinder engine from which measurements were taken for FIG. 3) by a positive phase dominated by the combustion torque. Crankshaft rotational acceleration (not shown) follows the same biphasic modulation as does crankshaft torque; the dynamics of crankshaft rotation thus carry rich combustion information. The present invention exploits this, along with the unique characteristics of HCCI combustion physics (discussed above and shown in FIG. 2), to estimate MRPR from an integrated metric of crankshaft dynamics.

Figure 4:
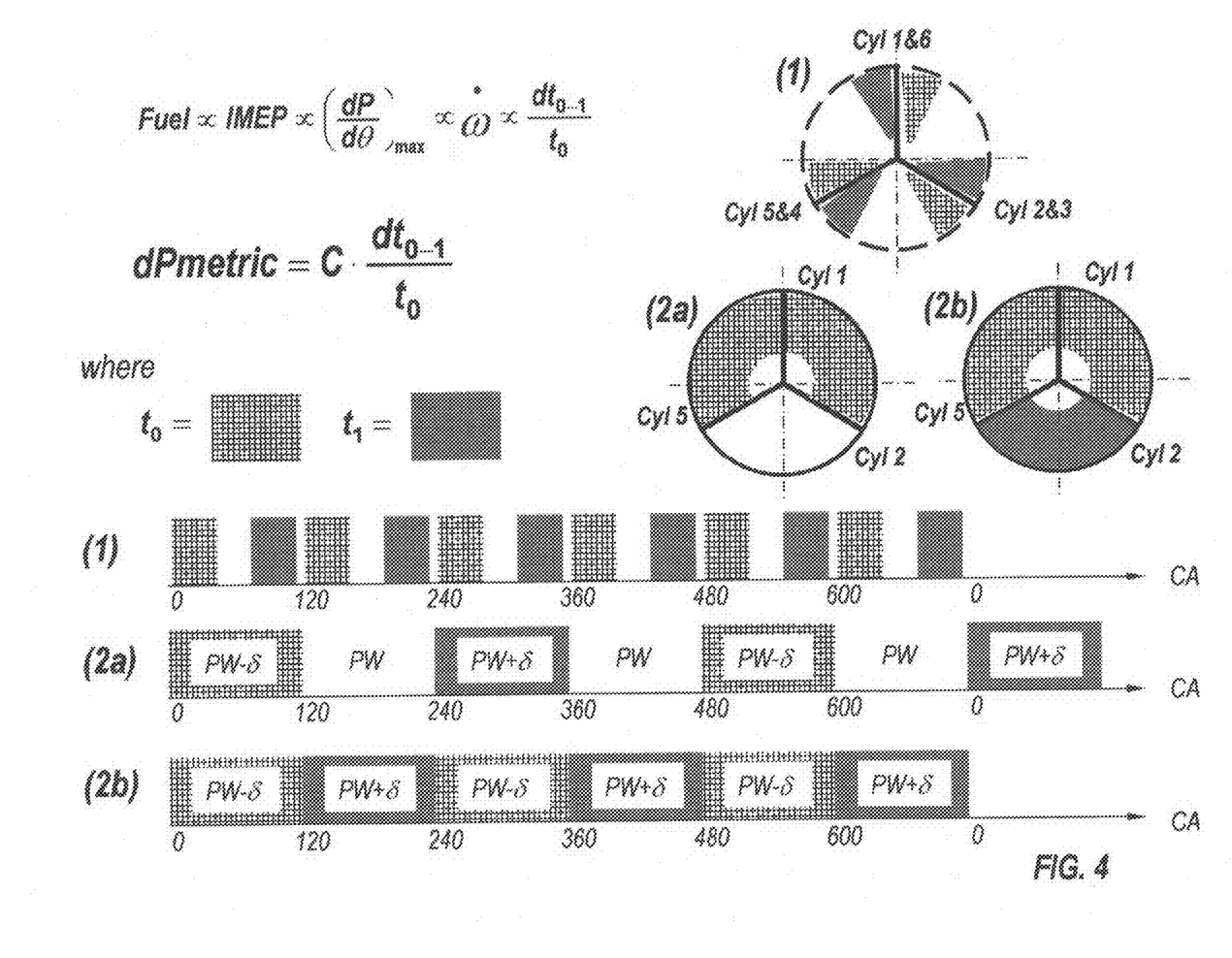
FIG. 4 illustrates three alternative methods, in accordance with the present invention, for calculation of a metric of crankshaft dynamics for use in estimating the value of MRPR.

FIG. 4 illustrates three alternative methods, all in accordance with the present invention, for extracting a crankshaft dynamics metric that is highly correlated to MRPR. Using a standard crankshaft position sensor and engine control module (ECM) counter, the method of the present invention captures the number of CPU ticks, $t_0$ and $t_1$, as measures of average crankshaft rotational velocity, during two selected crank angle windows. In method 1, two small crank angle windows are selected (appropriately for optimal signal-to-noise ratio), respectively, during the negative (inertia-dominated) and positive (combustion-dominated) phases of crankshaft torque modulation (shown in FIG. 3). A crankshaft dynamics metric, dPmetric, is then calculated as the difference between $t_0$ and $t_1$, normalized to (divided by) $t_0$. Normalization to $t_0$, which captures crankshaft velocity during the inertia-dominated phase of crankshaft rotation, ensures that dPmetric will isolate the combustion-driven component of crankshaft acceleration with optimal signal-to-noise ratio, and thus be highly correlated to MRPR for the associated combustion event.

Alternative methods 2a and 2b exploit the strong nonlinear behavior of piston engines to improve further the dPmetric signal-to-noise ratio, by introducing a small, known cross-cylinder fuel modulation. (Methods 2a and 2b are collectively referred to herein as the "fuel modulation methods"). FIG. 4 illustrates this for an evenly fired 6-cylinder engine, with cylinder firing order 1-2-5-6-3-4, where a cross-cylinder modulation increment, ±δ, is introduced around a nominal fuel pulse width, PW. For method 2a, "lean" cylinder 1 receives a slightly shorter fuel pulse, PW-δ, "neutral" cylinder 2 receives the nominal fuel pulse, PW, and "rich" cylinder 5 receives a slightly longer pulse, PW+δ. A rolling cross-cylinder alternation continues, so that a neutral cylinder always separates a lean-rich pair, isolating the cross-cylinder interaction noise. This method proceeds by recording CPU tick counts during the entire 120-degree crank angle period (see FIG. 3) for the lean and rich cylinders: these tick counts are then inserted as the values for $t_0$ and $t_1$, respectively, and calculation of dPmetric proceeds as for method 1.

While substantially improving signal-to-noise ratio, a drawback of method 2a is that the system needs two cylinder events for every dPmetric calculation, slowing down MRPR estimation and feedback control operation. Method 2b overcomes this speed issue, by eliminating the neutral cylinder, for faster calculation (though at the cost of a slight signal-to-noise loss). In the preferred embodiment of the HCCI control system of the present invention, all three methods for calculating dPmetric are employed, with the optimal method selected based on the engine type, speed/load operating point, and commanded power demand. For example, the fuel modulation methods may be optimal for engines with more than four cylinders, with method 2a employed during steady-state operation and method 2b during engine transients.

In accordance with the present invention, once the crankshaft dynamics metric, dPmetric, is calculated as above, the value of MRPR is estimated via statistical vector-to-vector correlation, as follows.

MRPR Estimation

For a given engine, both MRPR and dPmetric are functions of the same variables, e.g., fuel quantity (PW), oxygen concentration ($O_2\%$), intake air temperature (IAT), manifold absolute pressure (MAP), engine speed (RPM), etc., as shown by the equations below:

$$MRPR = f[IAT, O_2\%, PW, MAP, RPM \ldots ] = f[X] = f\begin{bmatrix} x_1 \\ x_2 \\ x_3 \\ x_4 \\ x_5 \\ \ldots \end{bmatrix}$$

$$dPmetric = g[IAT, O_2\%, PW, MAP, RPM, \text{intertia}, \ldots] = g[X] = g\begin{bmatrix} x_1 \\ x_2 \\ x_3 \\ x_4 \\ x_5 \\ \ldots \end{bmatrix}$$

The two vector functions, $f$ and $g$, are similar but not identical; so, engine calibration is needed, in developing the engine for HCCI operation, in order to correlate the two functions for a the given engine type. Engine calibration is used to sample the multidimensional space relating MRPR (measured directly during calibration with in-cylinder pressure transducers) to dPmetric and key engine state parameters, across the engine's HCCI operating range. Based on the engine calibration data, the vector-to-vector transfer function, $h_{dPmetric}$, relating MRPR to dPmetric across engine states, is statistically derived and simplified by principle component analysis, in order to reduce ECM computational effort and increase control robustness.

$$\begin{bmatrix} x_1 \\ x_2 \\ x_3 \\ x_4 \\ \ldots \\ MRPR \end{bmatrix} = h_{dPmetric} \begin{bmatrix} x_1 \\ x_2 \\ x_3 \\ x_4 \\ \ldots \\ dPmetric \end{bmatrix}$$

Figure 5:
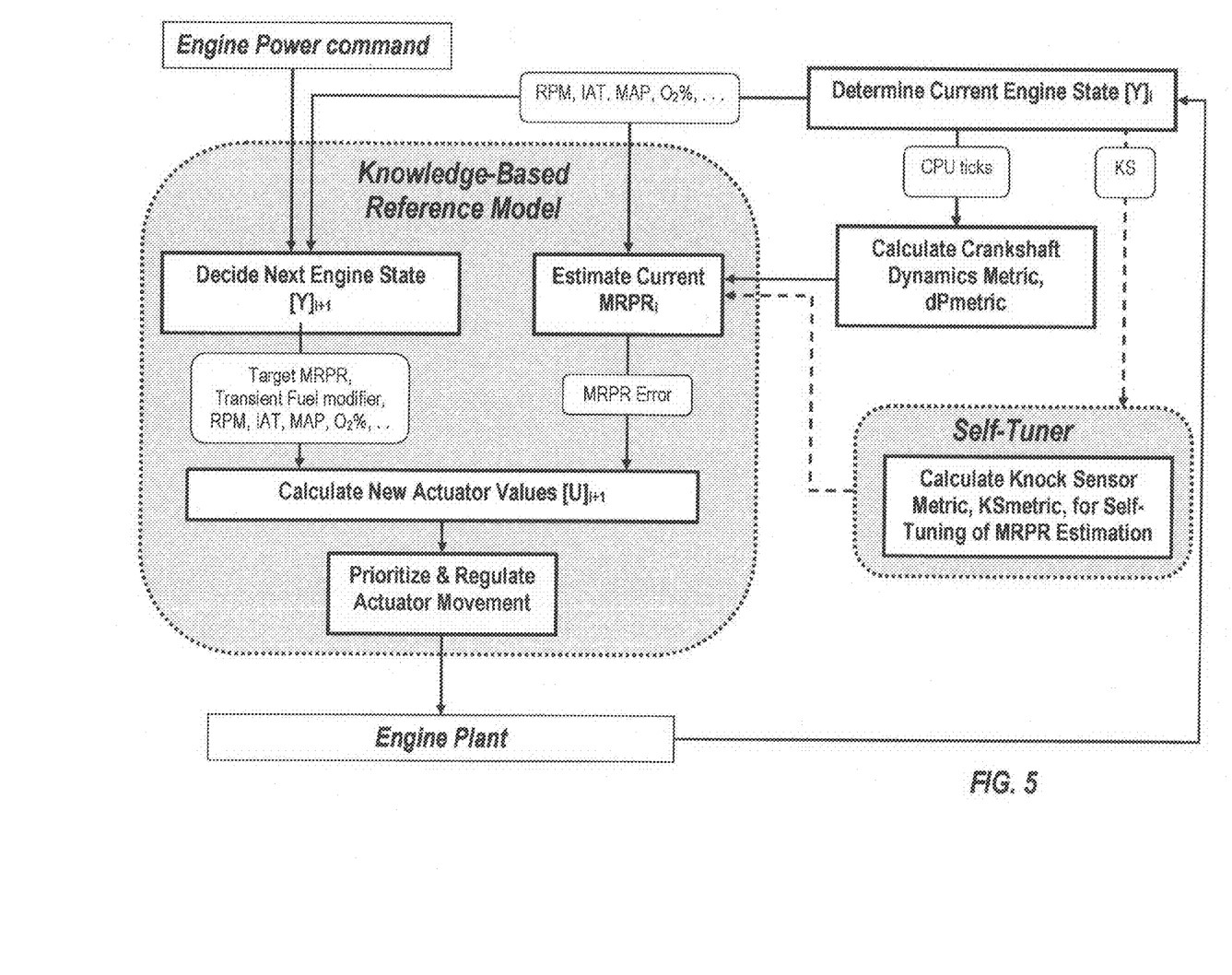
FIG. 5 is a flow chart of the preferred steps in the self-tuning and model reference adaptive control method of the present invention.

Multiple vector-to-vector transfer functions (or correlation functions) are derived, in order to permit robust estimation of MRPR from the crankshaft dynamics metric during steady-state, quasi-steady state (e.g. engine warm-up after cold start), and transient operation. Collectively, these multiple transfer functions (and others described below) constitute the knowledge base reference model employed for adaptive HCCI engine control, in accordance with the present invention. During engine operation, the reference model receives a host of inputs, as shown in FIG. 5, including (1) the value (or multiple values for a multicylinder engine) of dPmetric for the current combustion cycle, and (2) signals from various engine sensors, carrying the current engine state information, including engine speed (RPM) and values of key engine parameters, such as boost pressure, oxygen concentration in the exhaust and charge air, intake air temperature, etc. (vector $[Y]_i$ in FIG. 5). Based on these inputs, the reference model estimates the current value of MRPR, for each cylinder, using the appropriate transfer function above.

Self-Tuning

MRPR estimation from the crankshaft dynamics metric offers the significant advantage of eliminating the need for in-cylinder pressure transducers. Given the strong non-linear behavior of an internal combustion (IC) engine, however, self-tuning is needed to ensure accurate estimation of MRPR as the system identification changes over time, due to external conditions, aging or other factors.

Figure 6:
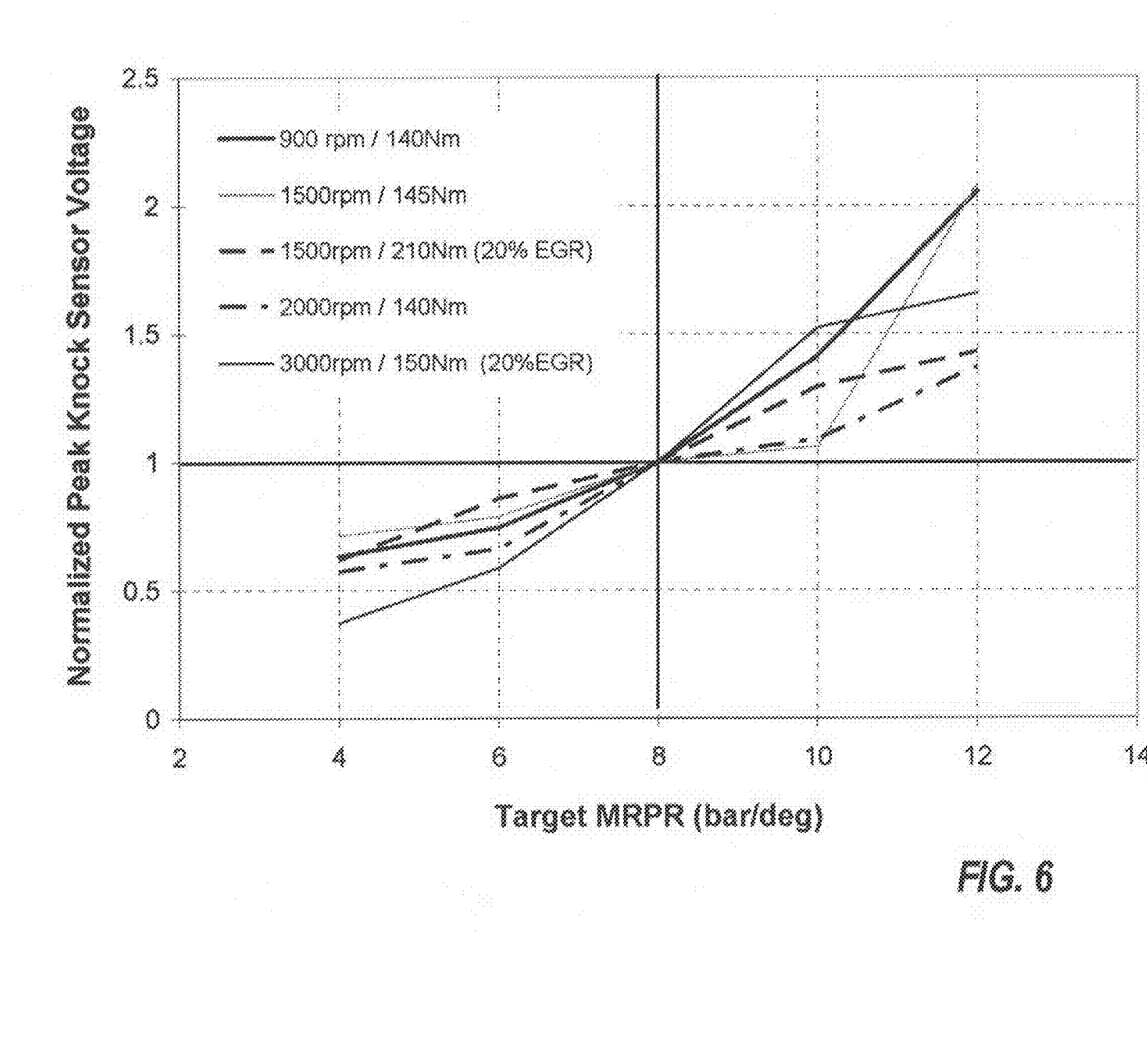
FIG. 6 is a graph presenting the change in normalized peak knock sensor voltage with different target-MRPR conditions.

An alternative basis for MRPR estimation, in accordance with the present invention, is a normalized metric of the knock sensor (accelerometer) signal. Applicants noted that the unfiltered knock sensor signal carries remarkably rich information about HCCI combustion status. In particular, within the stable HCCI combustion range (MRPR values of about 2 to 12 bar/deg), a knock sensor metric, such as normalized peak knock sensor voltage, is highly correlated with the value of MRPR, across a HCCI engine's operating range (see FIG. 6). The physical basis for this correlation is that the piezoelectric knock sensor is ideally suited to sense vibrations resulting from the gas pressure force changes inside the cylinder during combustion (so long as the sensor is positioned to receive these vibrations undampened by plastic or other materials); MRPR is a measure of these same pressure force changes. HCCI engine calibration, in accordance with the preferred embodiment of the present invention, thus includes simultaneous measurement and recording of the knock sensor voltage trace and normalized knock sensor metric (hereinafter, KSmetric), along with the crankshaft dynamics metric, in-cylinder MRPR, and key engine state parameters, as described above. Because the knock sensor metric is also a function of the same variables as dPmetric and MRPR—e.g., fuel quantity (PW), oxygen concentration (O2%), intake air temperature (IAT), etc.—vector-to-vector transfer functions, $h_{KSmetric}$, relating MRPR to KSmetric under different engine operating conditions, may be statistically derived.

$$\begin{bmatrix} x_1 \\ x_2 \\ x_3 \\ x_4 \\ \ldots \\ MRPR \end{bmatrix} = h_{KSmetric} \begin{bmatrix} x_1 \\ x_2 \\ x_3 \\ x_4 \\ \ldots \\ KSmetric \end{bmatrix}$$

Significantly, calculating two extra-cylinder sensor metrics, such as the knock sensor metric (KSmetric) and crankshaft dynamics metric (dPmetric) under the preferred embodiment, permits reciprocally constraining the statistical vector-to-vector correlation functions used, respectively, to determine the value of MRPR from each of the two metrics. This allows for self-tuning of MRPR estimation, to ensure long-term control robustness as the engine's system identification changes. The knock sensor signal is thus used for several control purposes, in accordance with the present invention. First, the knock sensor signal is a second, extra-cylinder sensor signal from which the value of MRPR may be estimated. Second, under the preferred embodiment, the knock sensor signal is used for self-tuning of the statistical vector-to-vector correlation functions for MRPR estimation, in order to ensure nonlinear control convergence and long term robustness. Finally, under one embodiment, the knock sensor metric may be used in place of, or in conjunction with, the crankshaft dynamics metric for mode recognition during HCCI-SI mode switching (as described below).

Adaptive Control

In addition to the statistical vector-to-vector transfer functions used for MRPR estimation, the knowledge base reference model of the present invention also provides guidance for engine control during commanded power changes. This guidance permits optimal adjustment, in both quantity and sequence, of various hardware settings, such as EGR and VGT valve positions, fan speed, etc., in order to control the cycle-by-cycle fueling rate and reach the target values for various engine state parameters in a controlled manner. Such guidance may be in the form of tables or equations that are established during the engine development and calibration stage, and is important because the engine state during transient operation can be very different from that indicated by a steady state map.

For example, if the engine speeds up from 10 to 40 kW at a rate of 50 rpm per cycle, adjustment of fuel quantity, EGR valve position, VGT position, and cooling fan speed along the path indicated by the steady state map would lead to misfire. This is because, by itself, the feedback signal, the extra-cylinder sensor metric used to estimate MRPR, can only fine tune fuel quantity based on the cycle-to-cycle MRPR error, when the engine state is not significantly changed; the feedback signal cannot account for dynamic changes in engine state during speed/load transitions. For the example above, the fuel quantity commanded for the next cycle would be too low, if based on the steady state map and feedback signal alone.

Stored in the knowledge base reference model of the preferred embodiment of the present invention is a transient fuel modifier matrix, prescribing additional fuel quantities needed during different speed/load transitions. During transient operation, cycle-to-cycle fuel quantity is adjusted as a function of both the feedback signal as well as a reference model multiplier in order to maintain MRPR values within the limits for stable HCCI combustion. In the example above, approximately 20% additional fuel (a multiplier of 1.2), beyond what would be commanded based on the feedback error signal alone, would be added during the first cycle of the transition. Further, both VGT and EGR valves would be closed briefly to increase internal EGR, which is hot, and allow a quicker boost increase; these valves would then be ramped to their steady-state position after the engine has reached the target speed.

A preferred embodiment of the present invention includes a dual-mode engine using gasoline-like fuel, in which the engine operates in spark ignition (SI) mode at high loads (see also "Engine Control and Operation" below). In this embodiment, another use for reference model guidance from the fuel-modifier matrix is in stabilizing cycle-to-cycle crankshaft torque during HCCI-SI mode switching (another type of transient operation). Because the thermal efficiency of HCCI combustion is higher than that of SI combustion, fuel quantity needs to be increased during the transition from HCCI to SI operation, in order to maintain near-constant torque.

Under the preferred embodiment, the knowledge base reference model of the present invention offers the following additional guidance. For a given engine state, there is a finite range of fuel quantity that can be used for stable HCCI combustion. The lower and upper ends of this range correspond to the misfire (MRPR below about 2 bar/deg), and knock (MRPR above about 12 bar/deg, depending on the particular engine) limits. In accordance with the present invention, the knowledge base model will guide engine transition toward that combination of engine state parameters that will maximize the range of fuel quantity yielding MRPR values between 2 and 12 bar/deg (the misfire and knock limits), at the target speed/load point. A preferred target MRPR value is 6 bar/deg (or its equivalent dPmetric or KSmetric value) because it allows the maximum tolerance error in matching among engine state parameters.

Engine Control and Operation

Figure 7:
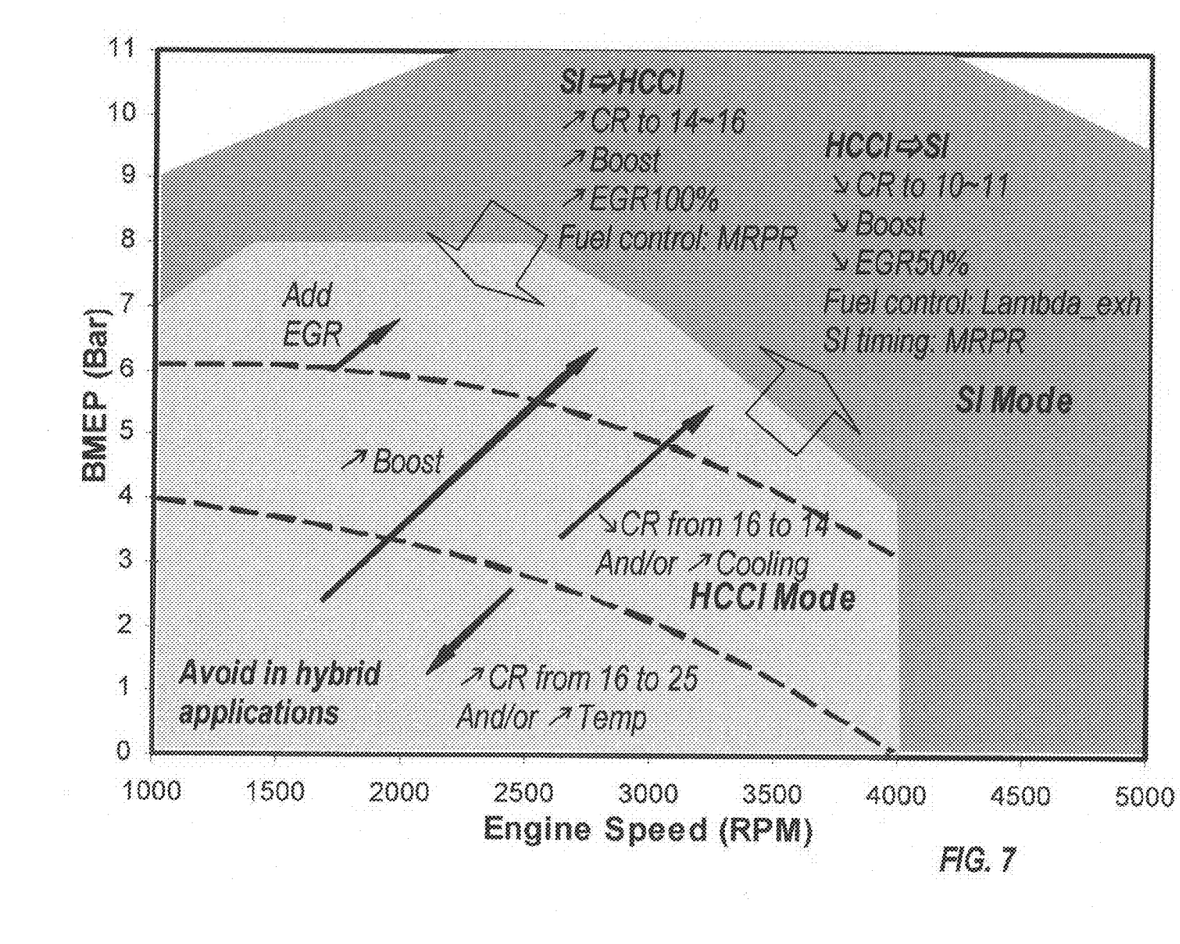
FIG. 7 illustrates the steady-state operating knowledge map for a HCCI-SI dual mode engine, indicating changes in key engine state parameters and control methods across different speed/load ranges and combustion modes, under a preferred embodiment of the present invention.

FIG. 7 shows the steady-state operating knowledge map for a HCCI-SI dual mode engine, indicating changes in key engine state parameters and control methods across different speed/load ranges and combustion modes, in accordance with a preferred embodiment of the present invention. Hardware settings—such as cooling fan speed, EGR and VGT valve positions, etc.—needed to yield the desired values for various engine state parameters at a given steady-state point are determined during the engine mapping and calibration process and are stored in the knowledge base reference model. Stable HCCI combustion during steady-state operation is maintained via model reference adaptive feedback control of MRPR. Stable HCCI combustion during commanded power changes, as well as smooth engine operation during HCCI-SI mode switching, are accomplished via extensive guidance from the knowledge base reference model, as described above.

As FIG. 7 illustrates, the engine operates in HCCI mode in the low-to-medium load region of the map, where SI mode operation has relatively low efficiency (in this region, the gas-to-fuel ratio is twice as high in HCCI as in SI mode). At a load of 7-8 bar BMEP, for example, cooling to the intake charge is reduced relative to a load of 0 BMEP, and effective compression ratio (CR) is decreased from as high as 25 to about 14. At loads above 5 bar BMEP, EGR is increased. During transient operation, adjustments of these various engine state parameters, from one set of steady-state values to another, are made under model reference adaptive actuator control. Concurrently, cycle-to-cycle fueling rate is adjusted, with additional fuel provided during the first few cycles of the transition, in order to maintain MRPR values within the range for stable HCCI combustion. During steady state operation such as cruising, or slow transients such as coolant temperature increases during warm up, cycle-to-cycle fueling rate is controlled based solely on the MRPR error, derived from the dPmetric or KSmetric feedback signal. MRPR is typically maintained around a target value of 6 bar/deg, in order to maximize the tolerance for selecting the optimal combination of engine state parameter values.

For load requirements above 7-8 bar BMEP, as in the case of acceleration or climbing a hill, the engine switches to SI mode. At high loads, SI mode operation offers the advantages of a quicker response time and lower noise level relative to HCCI mode, as well as a reduced relative loss in thermal efficiency, compared to lower-load operation (when SI operation suffers throttle losses). In the SI-mode region of the engine's operating map, the dPmetric or KSmetric feedback signal is used to control spark timing, in order to maximize efficiency while keeping combustion below the knock limit (MRPR below about 2.5 bar/deg for SI combustion). Further, during SI operation, effective CR is kept around a value of 10-11. Where application of the present invention is in a hybrid vehicle, the operating strategy can be optimized such that the engine never operates in the lower left region of the operating map, as indicated in FIG. 7 (except for idle operation if desired); effective CR in this region would be reduced to 12-14.

HCCI-SI mode switching is accomplished in one to a few cycles depending on engine speed. Since SI combustion duration is much longer than for HCCI combustion, the value of both dPmetric and KSmetric will show a significant increase as combustion is switched from SI to HCCI (even with a decreased fueling rate), and vice versa. Either metric may thus be used to detect whether the engine is running in HCCI or SI mode, and to apply the proper control strategy accordingly.

As stated above, the present invention includes a HCCI engine with a control system for maintaining stable, efficient HCCI combustion at all speed and load points of engine operation and during speed/load transitions. Stable HCCI combustion is ensured through estimation and control of a uniquely robust parameter of HCCI combustion, namely, the maximum rate of pressure rise inside the cylinder. Critically, the present invention estimates the value of MRPR indirectly based on signals from existing extra-cylinder sensors, such as a crankshaft position sensor or knock sensor, thereby eliminating the need for in-cylinder pressure transducers; MRPR is maintained to a target value, for stable HCCI combustion, via model reference adaptive feedback control.

It will be understood that the particular embodiments of the invention presented herein do not constitute all of the potential embodiments of the invention, and thus the scope of the invention is limited only by the claims hereinafter, and not by the individual embodiments particularly detailed above.

We claim:

1. A method of operating a multicylinder homogeneous charge compression ignition (HCCI) internal combustion engine across transients, comprising:
   taking into each of a plurality of combustion chambers a quantity of fuel and a quantity of charge-air,
   calculating a cylinder-specific crankshaft dynamics metric,
   determining the approximate maximum rate of pressure rise in the combustion chamber of each cylinder, for each combustion event, from the crankshaft dynamics metric without the use of in-cylinder pressure measurements,
   adjusting fuel quantity along with one or more engine state parameters, responsive to the determined maximum rate of pressure rise, in order to adjust the maximum rate of pressure rise to a target value for stable HCCI combustion, and to achieve a desired change in engine load for subsequent combustion events.

2. The method of claim 1, further comprising calculating the cylinder-specific crankshaft dynamics metric from the difference between (1) crankshaft rotational velocity in a first crank angle window, corresponding to the combustion event in the specific cylinder, and (2) crankshaft rotational velocity in a second crank angle window, corresponding to the inertia-dominated phase of crankshaft rotation.

3. The method of claim 2, further comprising determining crankshaft rotational velocity by counting CPU ticks during each of the first and second crank angle windows, using an engine control module counter and signals from a crankshaft position sensor.

4. The method of claim 1, further comprising:
   modulating fuel quantity by a small, known increment above and below a nominal fuel quantity, to produce a rolling alternation across sequentially firing cylinders of a relatively fuel-rich and a relatively fuel-lean cylinder, and
   calculating the cylinder-specific crankshaft dynamics metric from the difference between (1) crankshaft rotational velocity in a first crank angle window, corresponding to the combustion event in a fuel-rich cylinder and (2) crankshaft rotational velocity in a second crank angle window, corresponding to the combustion event in the successively firing fuel-lean cylinder.

5. The method of claim 4, further comprising determining crankshaft velocity by counting CPU ticks during each of the first and second crank angle windows, using an engine control module counter and signals from a crankshaft position sensor.

6. The method of claim 1, further comprising:
   modulating fuel quantity by a small, known increment above and below a nominal fuel quantity, to produce a rolling alternation across sequentially firing cylinders of a relatively fuel-rich and a relatively fuel-lean cylinder, where each successively firing pair of fuel-rich and fuel-lean cylinders is separated by a fuel-nominal cylinder, and
   calculating the cylinder-specific crankshaft dynamics metric from the difference between (1) crankshaft rotational velocity in a first crank angle window, corresponding to the combustion event in a fuel-rich cylinder and (2) crankshaft rotational velocity in a second crank angle window, corresponding to the combustion event in the successively firing fuel-lean cylinder.

7. The method of claim 6, further comprising determining crankshaft velocity by counting CPU ticks during each of the first and second crank angle windows, using an engine control module counter and signals from a crankshaft position sensor.

8. The method of claim 1, further comprising determining the approximate maximum rate of pressure rise from the crankshaft dynamics metric via statistical vector-to-vector correlation.

9. The method of claim 8, further comprising self-tuning the statistical vector-to-vector correlation based on signals from a knock sensor.

10. The method of claim 1 further comprising adjusting the fuel quantity and one or more engine state parameters for subsequent combustion events, responsive to:
    (1) a feedback signal, reflecting a difference between the determined and target values for either the maximum rate of pressure rise or the crankshaft dynamics metric, and,
    (2) guidance from a knowledge base model of engine operation.

11. The method of claim 10, further comprising:
    adjusting fuel quantity during combustion mode switching, in an engine operable in both homogeneous charge compression ignition (HCCI) and spark ignition (SI) modes, to account for differences in thermal efficiency between HCCI and SI combustion,
    detecting the current combustion mode from the determined value of the maximum rate of pressure rise or crankshaft dynamics metric, and
    selecting a knowledge base model of engine operation appropriate to the detected combustion mode.

12. A method of determining the maximum rate of pressure rise in one or more combustion chambers of homogeneous charge compression ignition (HCCI) internal combustion engine, comprising:
    determining a statistical vector-to-vector correlation between the maximum rate of pressure rise and a crankshaft dynamics metric in HCCI combustion,
    calculating the crankshaft dynamics metric, and
    using the statistical vector-to-vector correlation to estimate the maximum rate of pressure rise from the crankshaft dynamics metric without the use of an in-cylinder pressure transducer.

13. A method of operating a multicylinder homogeneous charge compression ignition (HCCI) internal combustion engine across transients, comprising:
    taking into each of a plurality of combustion chambers a quantity of fuel and a quantity of charge-air,
    calculating an integrated metric of signals received from each of one or more extra-cylinder sensors, to produce one or more extra-cylinder sensor metrics for each combustion event,
    determining the approximate maximum rate of pressure rise in the combustion chamber of each cylinder, for stable non-knocking HCCI combustion events, from the one or more extra-cylinder sensor metrics without the use of in-cylinder pressure measurements, through one or more statistical vector-to-vector correlation functions, and
    adjusting fuel quantity along with one or more engine state parameters, responsive to the determined maximum rate of pressure rise, in order to adjust the maximum rate of pressure rise to a target value for stable HCCI combustion, and to achieve a desired change in engine load for subsequent combustion events.

14. The method of claim 13, further comprising:
calculating at least two extra-cylinder sensor metrics, and periodically self-tuning the statistical vector-to-vector correlation functions, through which the maximum rate of pressure rise is determined from the extra-cylinder sensor metrics.

15. The method of claim 13, wherein one of the extra-cylinder sensor metrics is a knock sensor metric, calculated from signals received from a knock sensor.

16. The method of claim 13, wherein one of the extra-cylinder sensor metrics is a crankshaft dynamics metric, calculated from signals received from a crank angle position sensor.

17. The method of claim 13, wherein two of the extra-cylinder sensor metrics are a crankshaft dynamics metric and a knock sensor metric.

18. The method of claim 17, further comprising using the crankshaft dynamics metric and knock sensor metric to self-tune the statistical vector-to-vector correlation functions through which the maximum rate of pressure rise is determined.

* * * * *